United States Patent
Renninger et al.

(10) Patent No.: US 6,318,170 B1
(45) Date of Patent: Nov. 20, 2001

(54) MEASUREMENT DEVICE FOR MEASURING THE MASS OF A FLOWING MEDIUM

(75) Inventors: Erhard Renninger, Markgroeningen; Hans Hecht, Korntal-Muenchingen; Gerhard Hueftle, Aspach; Uwe Konzelmann, Asperg; Matthias Kallabis, Wutha Farnroda; Andreas Stark, Lauscha; Michael Rudloff, Eisenach; Henning Marberg, Weil der Stadt, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/319,149
(22) PCT Filed: Aug. 21, 1998
(86) PCT No.: PCT/DE98/02441
§ 371 Date: Sep. 20, 1999
§ 102(e) Date: Sep. 20, 1999
(87) PCT Pub. No.: WO99/18415
PCT Pub. Date: Apr. 15, 1999

(30) Foreign Application Priority Data

Oct. 1, 1997 (DE) .............................. 197 43 409

(51) Int. Cl.$^7$ ........................................ G01F 1/68
(52) U.S. Cl. ........................................ 73/204.26
(58) Field of Search .................. 73/861, 204.26, 73/727; 235/492; 250/253; 29/592

(56) References Cited

U.S. PATENT DOCUMENTS

| 4,129,042 | * | 12/1978 | Rosvold | ................................. 73/727 |
| 4,220,852 | * | 9/1980 | Seidel | ................................... 250/253 |
| 5,723,784 | * | 3/1998 | Lembke et al. | ................... 73/204.26 |
| 5,834,755 | * | 11/1998 | Haghiri-Tehrani et al. | ......... 235/492 |

* cited by examiner

Primary Examiner—Benjamin R. Fuller
Assistant Examiner—Corey D. Mack
(74) Attorney, Agent, or Firm—Ronald E. Greigg

(57) ABSTRACT

A measurement device for measuring the mass of a medium flowing along a flow direction, in particular the intake air mass of an internal combustion engine, has a plate-shaped sensor element, which is inserted into a recess of a sensor support. The sensor element includes a membrane that supports a measuring element, which membrane encloses a hollow space embodied in the sensor element on the side remote from the sensor support. The sensor element is secured in the recess by means of a glue between the sensor support and a bottom face of the sensor element oriented toward the sensor support. According to the invention, the glue constitutes a glue seam that extends around the hollow space of the sensor element between the sensor support and the bottom face of the sensor element and is only open on the side remote from the flow direction by means of at least one recess in order to ventilate the hollow space.

20 Claims, 2 Drawing Sheets

MEASUREMENT DEVICE FOR MEASURING THE MASS OF A FLOWING MEDIUM

FIELD OF THE INVENTION

The invention is directed to improvements in a measurement device for measuring the mass of a flowing medium.

BACKGROUND OF THE INVENTION

A measurement device has already been disclosed by German Patent Publication 195 24 634 A1, which includes a plate-shaped sensor element with a dielectric membrane that is inserted into a recess of a sensor support. The sensor element is made of a semiconductor material, e.g. silicon, and is manufactured in a micromechanical construction. The membrane is comprised of a dielectric material, for example silicon nitride or silicon oxide. A measurement resistor and a heating resistor are disposed on the dielectric membrane, which are to a large extent thermally insulated from a silicon frame that encompasses the membrane due to the thin embodiment of the membrane and the low heat conductivity of the dielectric membrane. Between the dielectric membrane and the sensor support, there is a hollow space in the plate-shaped sensor element, which extends from a bottom face adjoining the sensor support to the dielectric membrane and is manufactured, for example, by means of an etching process. The sensor element is fixed in the recess of the sensor support by means of a glue. Since the relatively thin membrane must be protected from excess pressure peaks, a ventilation of the hollow space provided underneath the membrane cannot be omitted. The ventilation of the recess in the measurement sensor or the rear of the membrane, however, must take place so that a flow of the medium is kept away from the rear of the membrane in order to prevent the rear flow from contributing to the measurement signal. In order to prevent the penetration of glue into the hollow space adjoining the membrane, the gluing region does not extend over the entire sensor element, but the sensor element is glued into the recess of the sensor support on only half of its surface and the region of the sensor element which has the electric membrane is disposed freely in the recess. In order to prevent underflow of the membrane, i.e. a flow of the medium to the hollow space embodied underneath the membrane, or to at least counteract this, a flow conduit is provided, which is embodied in the sensor support as a channel-shaped recess and extends around the sensor element. At the same time, the provision is made that the recess embodied in the sensor support is matched to the dimensions of the sensor element so that only a small gap respectively remains between the lateral boundary of the sensor element and the lateral boundary of the recess in the sensor support, which permits only a throttled flow of the medium to the hollow space disposed underneath the dielectric membrane.

However, it is disadvantageous in this embodiment that the sensor element must be aligned with high precision in regard to the recess of the sensor support during mounting in order to produce the extremely narrow gap. But this task cannot always be reliably fulfilled for tolerance reasons and due to manufacturing variations so that not insignificant losses in efficiency occur during manufacture.

A measurement device can be inferred from German Patent Publication 42 19 454 A1, in which a sensor element with a dielectric membrane is inserted into the recess of a cooling body. The cooling body has a ventilation bore between the cooling ribs in order to assure the ventilation of the rear of the membrane.

OBJECTS AND SUMMARY OF THE INVENTION

A principal object of the measurement device according to the invention is to provide the advantage over the prior art that in the manufacturing, a relatively low tolerance must be maintained in the positioning of the sensor element in relation to the recess of the sensor support. As a result, the manufacturing efficiency is increased and the manufacturing costs are reduced. Furthermore, the manufacturing speed can be increased. In another object of the invention the ventilation of the rear of the membrane remote from the flowing medium is reliably assured with a sufficient opening cross section so that a destruction of the sensor element due to pressure peaks is prevented. The glue seam is used simultaneously for tolerance compensation between the sensor element and the sensor support as well as for compensation of different coefficients of thermal expansion.

Yet another object of the invention provides that the glue seam extends into a region beneath the connecting elements for connection to the connecting wires or that an additional glue seam is provided in this region in order to assure a reliable fixing of the sensor element in the vicinity of the connecting elements and to counteract the danger of breakage when the connecting wire is attached, e.g. by means of bonding.

Still another object of the invention is to embody a recess in the sensor support, which communicates with the hollow chamber of the sensor element and is not completely covered by the sensor element. This recess of the sensor support can, for example, be produced by means of embossing. The recess of the sensor support reliably assures the ventilation of the rear of the membrane.

Still a further object of the invention provides that on a support face disposed opposite from the bottom face of the sensor element, spacers can be provided, which are produced, for example, by means of embossing, which set the distance between the sensor support and the bottom face of the sensor element to a precisely defined dimension. Furthermore, it is advantageous if the sensor support has at least one glue displacement chamber into which excess glue that is used to produce the glue seam can be displaced upon insertion of the sensor element into the recess of the sensor support. In this manner, an accumulation of glue at unfavorable locations is avoided, particularly in the hollow space of the sensor element that is formed underneath the membrane. The mechanical stress of the sensor element is minimized through the use of an elastic silicon glue, even when there are differences in thermal expansion coefficients between the material of the sensor element and the material of the sensor support.

BRIEF DESCRIPTION OF THE DRAWINGS

Exemplary embodiments of the invention are shown in simplified fashion in the drawings and will be explained in more detail in the description that follows.

DESCRIPTION OF THE EXEMPLARY EMBODIMENTS

Figure 1:
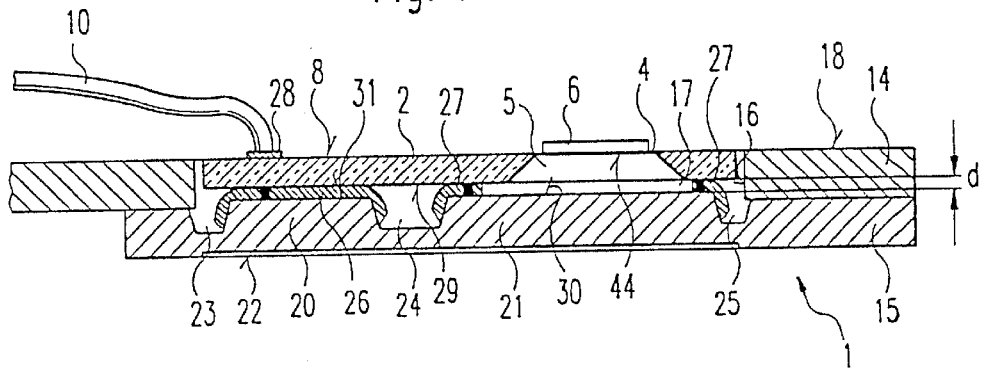
FIG. 1 shows a section along the line I—I in FIG. 2, through a measurement device corresponding to a first exemplary embodiment according to the invention.

The sensor support 1 depicted in a sectional view in FIG. 1 is provided for a plate-shaped sensor element 2. The sensor support 1 and the sensor element 2 are part of a measurement device not shown in detail, which is for measuring the mass of a flowing medium, in particular the intake air mass of an internal combustion engine.

The sensor support 1 is used to contain and secure the sensor element 2, which has a membrane-shaped sensor region, which is embodied, for example, in the form of a dielectric membrane 4. The sensor element 2 or the membrane 4 can be produced by means of etching a semiconductor body, for example a silicon wafer, in a so-called micromechanical construction, wherein a hollow space 5 is produced underneath the membrane 4. At least one temperature-dependent measurement resistor 6 and for example at least one heating resistor that is not shown, which are for example likewise produced by means of etching, are provided on the membrane 4 in order to measure the mass of the flowing medium. Outside the membrane 4, a reference resistor can be provided on the sensor element 2. The measurement resistor 6, the heating resistor, and the reference resistor are electrically connected to an electronic regulation circuit that is not shown in detail, for example by means of conductor strips and by means of wires 10 that are attached to connecting elements 28 which are embodied as bonding pads. The electronic regulation circuit is used in a known manner for supplying power or voltage to the resistors on the sensor element 2 and for evaluating the electrical signals emitted by the resistors. The regulation circuit can be accommodated, for example, in a housing or outside the housing of the measurement device.

The dielectric membrane 4 is comprised, for example, of silicon nitride and/or silicon oxide. The heating resistor can be embodied in the form of an electrically resistive layer that heats up with the flow of current and heats the membrane 4 to a temperature that is higher than the temperature of the medium to be measured. The heating resistor can, for example, be comprised of a metal or also of a correspondingly doped silicon. The measurement resistor and the reference resistor can, for example, be comprised of an electrically resistive layer whose conductivity changes as a function of the temperature. Suitable materials for these resistive layers are metals or correspondingly doped silicon.

Figure 2:
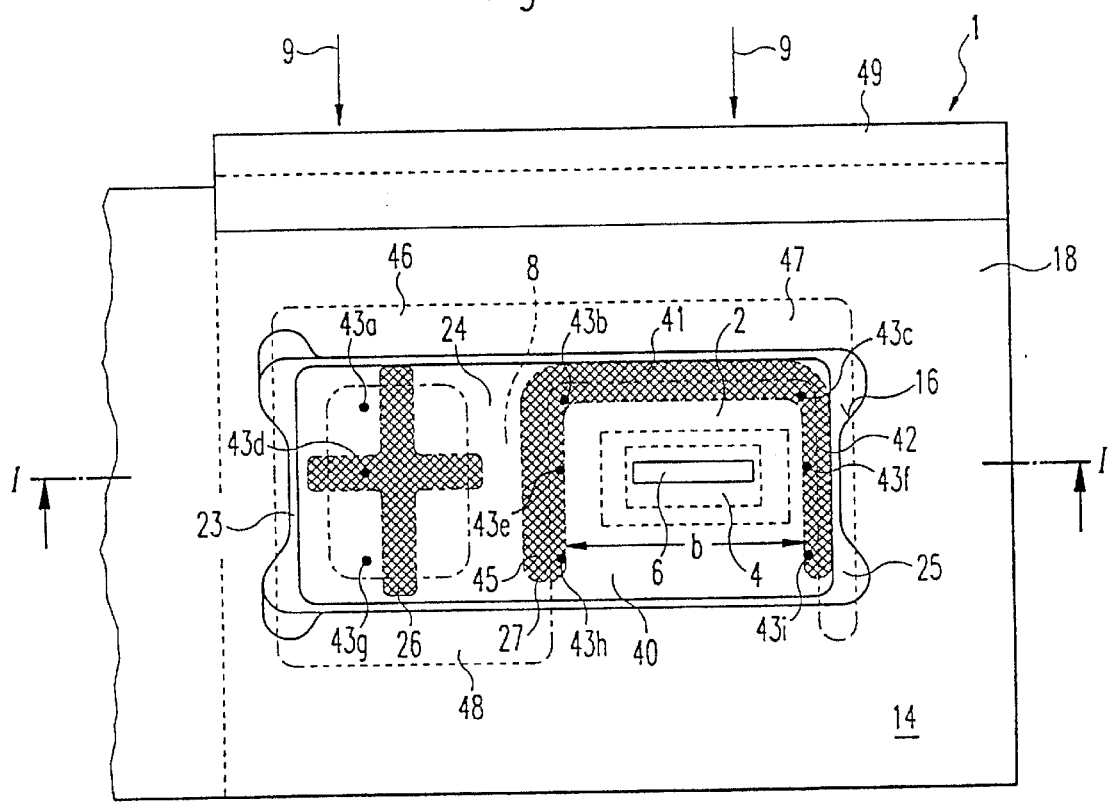
FIG. 2 is a top view of the measurement device according to FIG. 1.

The sensor element 2 has a plate-shaped, for example rectangular form and is aligned with its surface 8 oriented toward the flowing medium approximately parallel to the medium flowing into the plane of the drawing in FIG. 1, wherein a short side of the, for example, rectangular sensor element 2 extends in the flow direction 9. The flow direction 9 of the medium is indicated in FIG. 2 by means of corresponding arrows and travels from top to bottom there. The heating resistor attached to the membrane 4 heats the membrane 4 to a temperature that is higher than the temperature of the medium flowing past. The heat quantity of the heating resistor, which is dissipated from the medium flowing past essentially due to convection, depends on the mass of the flowing medium so that the mass of the flowing medium can be established by measuring the temperature of the membrane 4. The measurement of the membrane temperature can be carried out by means of the measurement resistor 6 or by measuring the resistance of the heating resistor. The reference resistor is used to compensate for the influence of the temperature of the medium flowing past.

The sensor support 1 is preferably comprised of metal and can be manufactured by folding a thin metal strip, for which punching, bending, folding, embossing, and stamping processes are suited. In the finished state of the bent metal strip, for example two elements 14 and 15 that are the same size rest against each other. In the following description, the element 14 that is not bent and encompasses the sensor element 2 will be referred to as the frame element 14 and the element 15 bent under it will be referred to as the securing element 15. In the completely bent state of approximately 180°, the securing element 15 covers an opening 16 of the unbent frame element 14 in order, together with the frame element 14, to define a recess 17 for containing the sensor element 2. The frame element 14 or the recess 17 has a cross section which approximately corresponds to the for example rectangular shape of the sensor element 2. The sensor element 2 is accommodated in the recess 17 with its surface 8 approximately flush to a surface 18 of the frame element 14.

Before the folding of the metal strip, the securing element 15 can be deformed by means of a tool that engages the outer surface 22 of the securing element 15, for example a stamping tool, so that two projections 20, 21 are produced in the cross section in the exemplary embodiment. In the cross section depicted in FIG. 1, the projections 20, 21 are each adjoined by glue displacement chambers 23, 24, and 25 to be described in more detail. As best shown in FIG. 2, on its end face oriented toward the flow direction 9, the sensor support 1 has a flattened region 49 in order to improve the flow behavior and to counteract the deposit of dirt particles.

According to the invention, the plate-shaped sensor element 2 is glued into the recess 17 of the sensor support 1 by means of a glue that is applied along glue seams 26, 27 in the form of glue beads. As shown more clearly in FIG. 2, which is a top view of the detail of the measurement device according to the invention, two glue seams 26 and 27 are provided in the exemplary embodiment depicted. A first glue seam 26 is embodied as a cruciform shape in the exemplary embodiment shown in FIGS. 1 and 2 and is used to glue the sensor element 2 onto the plateau-shaped projection 20. Connecting elements 28 embodied as bonding pads are provided on the surface 8 remote from the securing element 15 of the sensor support 1, in the vicinity of the plateau-shaped projection 20, and are used to electrically connect conductor strips of the sensor element 2 to connecting lines 10. The first glue seam 26 is used to fix the sensor element 2 in the vicinity of the connecting elements 28 in order to produce a secure bonding connection.

As shown in FIG. 2, the second glue seam 27, however, is embodied as U-shaped in the exemplary embodiment shown in FIGS. 1 and 2. The second glue seam 27 is used to glue the sensor element 2 in the vicinity of the plateau-shaped projection 21. The two glue seams 26 and 27 are respectively embodied between the bottom face 29 of the sensor element 2 and the surface 31 or 30 of the recesses 20 and 21 of the securing element 15.

According to the invention, the second glue seam 27 is is embodied so that it extends around the hollow space 5 between the sensor support 1 and the bottom face 29 of the sensor element 2 and is only opened by means of a recess 40 on the end remote from the flow direction 9. In the exemplary embodiment shown in FIGS. 1 and 2, the U-shape glue seam has a section 41 oriented toward the flow direction 9 as well as two sections 42 and 45 extending in the flow direction 9. The sections 42 and 45 extending in the flow direction 9 constitute two legs of the U-shaped second glue seam 27. In the exemplary embodiment of FIGS. 1 and 2, the recess 40 extends between the two sections 42 and 45 that extend in the flow direction 9, i.e. the glue seam 27 is open over the entire region remote from the flow direction 9. The recess 40 is used for the ventilation of the hollow space 5 of the sensor element 2. This ventilation is necessary since otherwise static pressure fluctuations in the flowing medium to be measured, in particular excess pressure peaks, can lead to a destruction of the dielectric membrane 4. However, the flowing medium must be prevented from flowing along the rear 44 of the membrane 4 since this would lead to an undesirable contribution to the measurement signal, which would lead to an indefinite and non-reproducible measurement result. According to the invention, therefore, the proposal is made to route the glue seam 27 so that it extends around the hollow space 5 of the sensor element 2 and is opened by a corresponding recess 40 only on the side remote from the flow direction 9.

The opening cross section of the recess 40 thereby defines a throttle location. This opening cross section is suitably established so that a sufficiently rapid pressure compensation is produced between the front of the membrane 4 oriented toward the flowing medium and the rear 44 of the membrane 4 oriented toward the hollow space 5 and away from the flowing medium, which pressure compensation prevents a destruction of the membrane 4. On the other hand, however, the opening cross section of the recess 40 must have small dimensions so that a flow of the medium in the hollow space 5 is prevented or is at least sufficiently suppressed. The opening cross section of the recess 40 is determined on the one hand by the width b of the recess 40 shown in FIG. 2 and is determined on the other hand by the thickness d of the glue seam 27 shown in FIG. 1. The thickness of the glue seam d can be determined, for example, by spacers 43a–43i. The spacers 43a–43i can be embodied, for example, by means of a stamping process by a stamping tool embodied for example in the form of a needle which engages the securing element 15 on the outer face 22. Alternatively, it is also conceivable to embody the spacers on the sensor element 2 by means of a suitable etching process or to disperse the spacers in the glue that constitutes the glue seams 26 and 27, e.g. as fine pellets with a constant diameter.

The glue seams 26 and 27 can be applied as fine glue beads with a conventional metering process. A glue that remains elastic after hardening is preferably suitable for use as the glue, in particular an elastic silicon glue. Mechanical stresses between the sensor element 2 and the sensor support 1 are therefore minimized. Mechanical stresses occur particularly as a result of the different thermal expansion coefficients of the sensor support 1 that is preferably made of a sheet metal and the sensor element 2 that is preferably made of a semiconductor material. With the use of the measurement device according to the invention to measure the intake air mass of an internal combustion engine, the intake air to be measured can be subjected to considerable temperature fluctuations depending on the external temperature of the vehicle.

On the side oriented toward the flow direction 9, the glue displacement chambers 23, 24, and 25 described above are connected by means of other glue displacement chambers 46 and 47. In the exemplary embodiment shown in FIGS. 1 and 2, the glue displacement chambers 23 and 24 are also connected by means of another glue displacement chamber 48 remote from the flow direction 9. When the sensor element 2 and the sensor support 1 are assembled, excess glue applied can escape into the glue displacement chambers 23, 24, 25, 46, 47, 48, as schematically depicted in FIG. 1. As a result, when the sensor element 2 and the sensor support 1 are assembled, glue is in particular prevented from penetrating into the hollow space 5 or even reaching the rear 44 of the membrane 4. The glue seam 27 must be placed so that a penetration of the glue into the hollow space 5 is reliably prevented since this can considerably impair the functional performance of the measurement device according to the invention.

Figure 3:
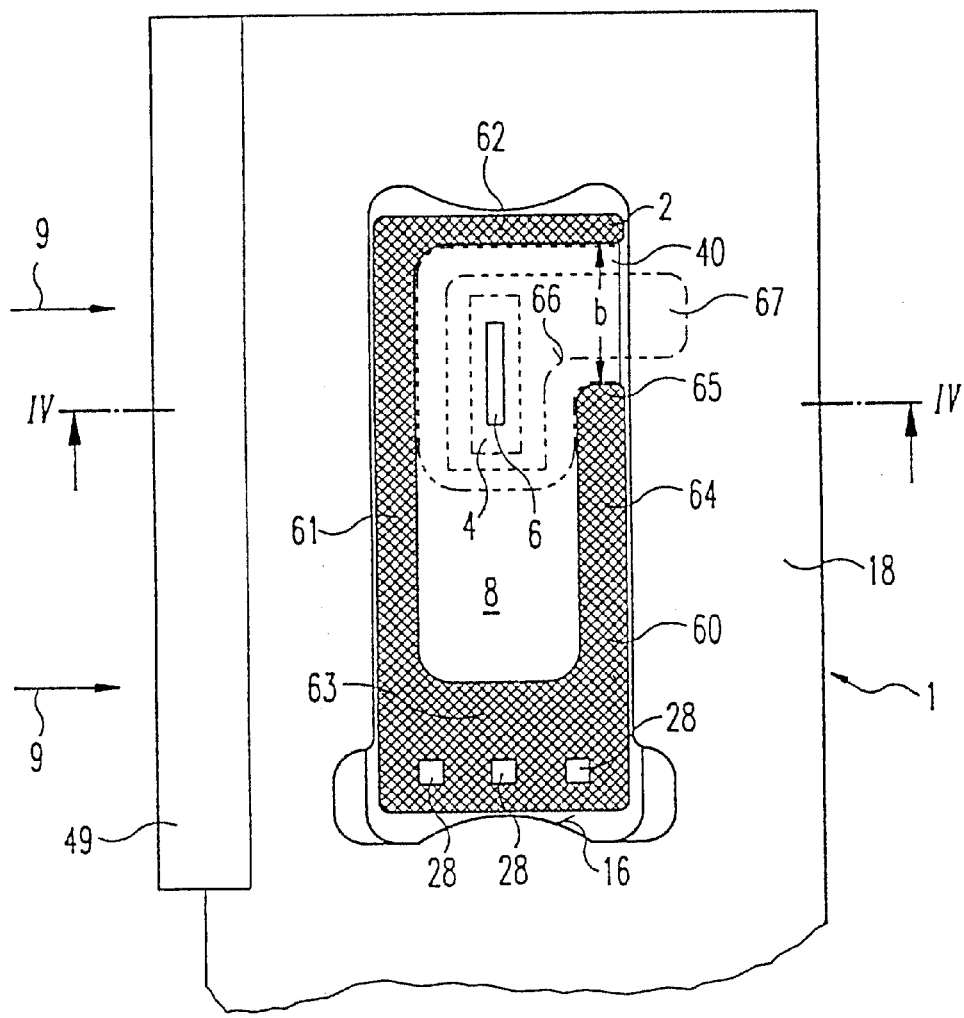
FIG. 3 is a top view of a measurement device corresponding to a second exemplary embodiment according to the invention.
Figure 4:
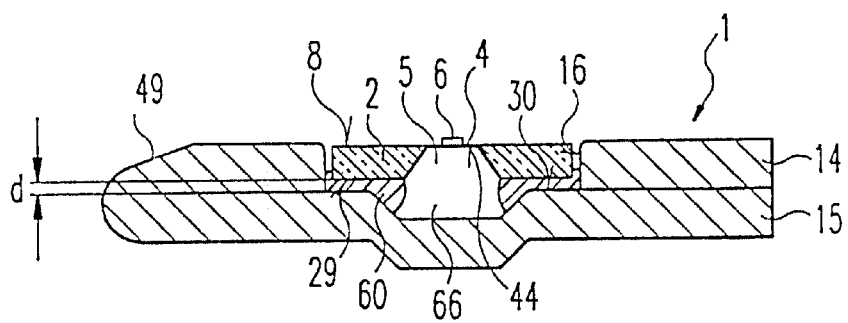
FIG. 4 shows a section along the line IV—IV in FIG. 3.

A second exemplary embodiment of the measurement device according to the invention is depicted in FIGS. 3 and 4. While FIG. 3 shows a top view of the measurement device according to the invention, FIG. 4 shows a section along the line IV—IV in FIG. 3. Elements already described above are indicated with corresponding reference numerals so that a repeat description is not necessary in this regard.

The difference in relation to the exemplary embodiments already described in relation to FIGS. 1 and 2 is comprised on the one hand in that a glue seam 60 that is embodied in one piece, extends in a G-shape around the hollow space 5 of the sensor element 2. The glue seam 60 has a section 61 oriented toward the flow direction 9, two sections 62 and 63 extending in the flow direction 9, and a section 64 remote from the flow direction 9. The section 64 remote from the flow direction 9 does not completely connect the sections 62 and 63 extending in the flow direction 9 so that a recess 40 is produced on the side remote from the flow direction 9. In the exemplary embodiment depicted in FIG. 3, the recess 40 extends from a first section 62 running in the flow direction 9 to a free end 65 of the section 64 of the glue seam 60 remote from the flow direction 9.

However, embodiments are also conceivable in which the recess 40 interrupts the section 64 remote from the flow direction 9 at another point. Also, a number of such recesses can be provided in the-section 64 remote from the flow direction 9. The second section 63 running in the flow direction extends so that it reaches into the region beneath the connecting elements 28 that are embodied in the form of bonding pads so that the sensor element is under-supplied with glue in the vicinity of the connecting elements 28. As a result, a high breaking strength of the sensor element 2 is assured during the application of the bonding connections. Furthermore, the sensor element 2 in the region of the connecting elements 28 is fixed particularly well by means of the glue seam 60 so that a good bonding connection can be produced even with the use of an elastic glue, e.g. a silicon glue.

In the exemplary embodiment shown in FIGS. 3 and 4, the glue seam 60 can reach into the edge region of the recess 17 embodied in the frame element 14. When the sensor element 2 is assembled with the sensor support 1, in order to prevent glue from penetrating into the hollow space 5 of the sensor element 2 or even reaching the membrane 4, a recess 66 is provided in the securing element 15 of the sensor support 1, e.g. by means of an embossing process. The recess 66 is used as a glue displacement chamber and absorbs excess glue. At the same time, the recess 66 is also used to ventilate the hollow space 5 of the sensor element 2. As can be seen from FIG. 3, the recess 66 is embodied as substantially L-shaped and extends through the recess 40 of the glue seam 60 until it reaches an elongated section 67. The elongated section 67 is therefore not covered by the sensor element 2 and is connected to the flowing medium to be measured for the pressure compensation, e.g. by way of bores, not shown, in the securing element 15.

The foregoing relates to preferred exemplary embodiments of the invention, it being understood that other variants and embodiments thereof are possible within the spirit and scope of the invention, the latter being defined by the appended claims.

What is claimed is:

1. A measurement device for measuring an intake air mass along a flow direction (9) of an internal combustion engine, comprising a plate-shaped sensor element (2), which is inserted into a recess (17) of a sensor support (1) and has a membrane (4) that supports a measuring element (6), which membrane encloses a hollow space (5) embodied in the sensor element (2) on a side remote from the sensor support (1), wherein the sensor element (2) is secured in the recess (17) by a glue means provided between the sensor support (1) and a bottom face (29) of the sensor element (2) oriented toward the sensor support (1), the glue means having a glue seam (27; 60) that extends around the hollow space (5) of the sensor element (2) between the sensor support (1) and the bottom face (29) of the sensor element (2), said glue means being open only on a side remote from the flow direction (9) by means of at least one recess (40) in order to ventilate the hollow space (5).

2. The measurement device according to claim 1, further comprising the glue seam (27) extends in a substantially U-shape around the hollow space (5) and is provided with a section (41) oriented toward the flow direction (9) and two sections (42, 45) extending in the flow direction (9).

3. The measurement device according to claim 1, further comprising the glue seam (60) extends in a substantially G-shape around the hollow space (5) and said glue seam (60) comprises a first section (61) oriented toward the flow direction (9), second and third sections (62, 63) extending in the flow direction (9), and a fourth section (64) remote from the flow direction (9), and the fourth section (64) remote from the flow direction (9) does not completely connect the second and third sections (62, 63) extending in the flow direction (9).

4. The measurement device according to claim 1, further comprising the plate-shaped sensor element (2) is provided with connecting elements (28) on a surface (8) remote from the sensor support (1), for connection to connecting wires (10) and another glue seam (26) is provided in a region opposite from the connecting elements (28), between the sensor support (1) and the bottom face (29) of the sensor element.

5. The measurement device according to claim 2, further comprising the plate-shaped sensor element (2) is provided with connecting elements (28) on a surface (8) remote from the sensor support (1), for connection to connecting wires (10) and another glue seam (26) is provided in a region opposite from the connecting elements (28), between the sensor support (1) and the bottom face (29) of the sensor element.

6. The measurement device according to claim 3, further comprising the plate-shaped sensor element (2) is provided with connecting elements (28) on a surface (8) remote from the sensor support (1), for connection to connecting wires (10) and another glue seam (26) is provided in a region opposite from the connecting elements (28), between the sensor support (1) and the bottom face (29) of the sensor element.

7. The measurement device according to claim 4, further comprising the other glue seam (26) has a substantially cruciform shape.

8. The measurement device according to claim 5, further comprising the other glue seam (26) has a substantially cruciform shape.

9. The measurement device according to claim 6, further comprising the other glue seam (26) has a substantially cruciform shape.

10. The measurement device according to claim 1, further comprising the plate-shaped sensor element (2) has connecting elements (28) on a surface (8) remote from the sensor support (1), for connection to connecting wires (10), the glue seam (27) is disposed on three sides around the hollow space (5) extending between the sensor support (1) and the bottom face (29) of the sensor element (2) and a region void of glue seam is disposed opposite from the connecting elements (28).

11. The measurement device according to claim 2, further comprising the plate shaped sensor element (2) has connecting elements (28) on a surface (8) remote from the sensor support (1), for connection to connecting wires (10), the glue seam (27) is disposed on three sides around the hollow space (5) extending between the sensor support (1) and the bottom face (29) of the sensor element (2) and a region void of glue seam is disposed opposite from the connecting elements (28).

12. The measurement device according to claim 3, further comprising the plate-shaped sensor element (2) has connecting elements (28) on a surface (8) remote from the sensor support (1), for connection to connecting wires (10), the glue seam (27) is disposed on three sides around the hollow space (5) extending between the sensor support (1) and the bottom face (29) of the sensor element (2) and a region void of glue seam is disposed opposite from the connecting elements (28).

13. The measurement device according to claim 1, further comprising a recess (66) is embodied in the sensor support (1), which communicates with the hollow space (5) of the sensor element (2) and is not completely covered by the sensor element (2).

14. The measurement device according to claim 3, further comprising a recess (66) is embodied in the sensor support (1), which communicates with the hollow space (5) of the sensor element (2) and is not completely covered by the sensor element (2).

15. The measurement device according to claim 10, further comprising a recess (66) is embodied in the sensor support (1), which communicates with the hollow space (5) of the sensor element (2) and is not completely covered by the sensor element (2).

16. The measurement device according to claim 1, further comprising the sensor support (1) has at least one glue displacement chamber (23, 24, 25, 46, 47, 48; 66) disposed opposite the bottom face (29) of the sensor element (2) into which excess glue used to form the glue seam (26, 27; 60) can be displaced upon insertion of the sensor element (2) into the recess (17) of the sensor support (1).

17. The measurement device according to claim 2, further comprising the sensor support (1) has at least one glue displacement chamber (23, 24, 25, 46, 47, 48; 66) disposed opposite the bottom face (29) of the sensor element (2) into which excess glue used to form the glue seam (26, 27; 60) can be displaced upon insertion of the sensor element (2) into the recess (17) of the sensor support (1).

18. The measurement device according to claim 3, further comprising the sensor support (1) has at least one glue displacement chamber (23, 24, 25, 46, 47, 48; 66) disposed opposite the bottom face (29) of the sensor element (2) into which excess glue used to form the glue seam (26, 27; 60) can be displaced upon insertion of the sensor element (2) into the recess (17) of the sensor support (1).

19. The measurement device according to claim 1, further comprising the glue means comprises an elastic silicon glue.

20. The measurement device according to claim 1, further comprising raised spacers (43a–43i) are provided on at least one of the support faces (30, 31) of the sensor support (1) opposite from the bottom face (29), which spacers determine a distance between the sensor support (1) and the bottom face (29) of the sensor element (2).

* * * * *